Feb. 22, 1944.    H. O. MURPHEY    2,342,210
BELT FASTENING MEANS
Filed Dec. 20, 1941

INVENTOR.
Harold O. Murphey
BY Frederick E. Lange
ATTORNEY.

Patented Feb. 22, 1944

2,342,210

UNITED STATES PATENT OFFICE 2,342,210

BELT FASTENING MEANS

Harold O. Murphey, Lincoln, Nebr.

Application December 20, 1941, Serial No. 423,777

6 Claims. (Cl. 2—322)

The present invention is concerned with a belt fastening means and more particularly one of the type employing wedging means for securing two overlapping portions of a belt together.

It is customary to employ some metal fastening means for securing two portions of a belt together in overlapping relationship. In the case of an ordinary belt forming part of wearing apparel, this fastening means usually takes the form of a metal buckle of either the prong or cam fastener type. The employment of a metal buckle of the cam fastener type often results in the belt being excessively abraded by the cam. Besides, the cost of manufacture of any metal buckle adds considerably to the cost of the belt and in periods of national emergency, such buckles require the use of materials for which there is demand for other purposes.

An object of the present invention is to provide a belt fastening means in which all of the elements of the fastening means are formed of material having substantially the same properties as the belt itself.

Broadly, an object of my invention is to provide a coupling comprising two overlapping portions of flexible yieldable material, a wedge shaped portion of a similar material secured to one of said portions, and a loop which clamps the overlapping portions together against the wedge shaped surface.

A further object of the present invention is to provide such a coupling in which the wedge shaped member is tapered both in thickness and in width so as to provide a wedging action in two directions.

A further object of the invention is to provide such an arrangement in which the wedge shaped member is looped over the end of the portion to which it is attached and provides two wedge faces on opposite sides of said portion.

Alternatively, a further object of the invention is to provide an arrangement in which a single wedge shaped member is used and in which the portion to which it is attached is looped over the wedge shaped member.

A further object of the present invention is to provide an arrangement according to either of the last two objects in which a guiding loop is disposed between the wedge shaped member and the portion to which it is secured.

A further object of the invention is to provide such an arrangement in which the portion to which the wedge shaped member is secured has a stud projecting therefrom and in which the other portion has a plurality of openings into any one of which said stud is adapted to extend.

Further objects of the invention will be apparent from a consideration of the accompanying specification, claims, and drawing of which:

Figure 1:
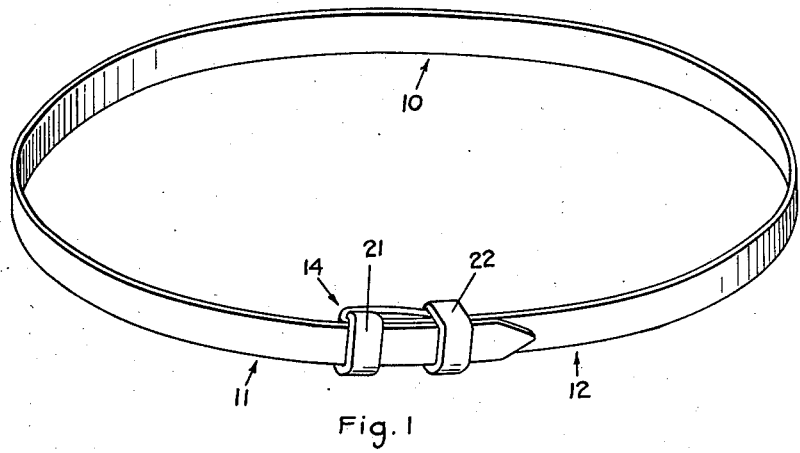
Figure 1 is a perspective view of a belt employing my improved belt fastening means.
Figure 6:
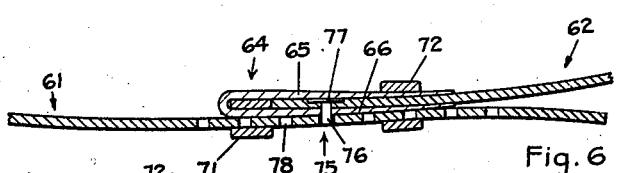
Figure 6 is a transverse sectional view of a further modified form.

Referring to the drawing for a more detailed understanding of my invention, and more particularly to Figure 1 of the drawing, it will be noted that the belt fastening means is shown in connection with a belt 10. This belt is formed of leather or some similar flexible yieldable material. The belt is provided with two end portions which are designated generally by the reference numerals 11 and 12. The end portion 11 is normally the free end portion and is the one which is moved in connecting and disconnecting the belt. The portion 12 usually remains relatively stationary with respect to the clothing. Looped around the end of portion 12 is a wedge member 14. In the preferred species, this wedge shaped member is provided with two tapered portions 15 and 16 which are disposed on opposite sides of the portion 12 and are stitched to the wedge member as indicated by numeral 17 in Figure 3. Not only is the member 14 tapered as to thickness adjacent its ends but it is also tapered as to width. While both portions 15 and 16 of the wedge shaped member 14 can be tapered as to their width, it is preferable that only the portion 16 be so tapered. As indicated in Figure 6, this is done by cutting the portion 16 away along diagonal lines 18 and 19 extending from the end a substantial distance rearwardly. The importance of this feature will be discussed later.

Figure 3:
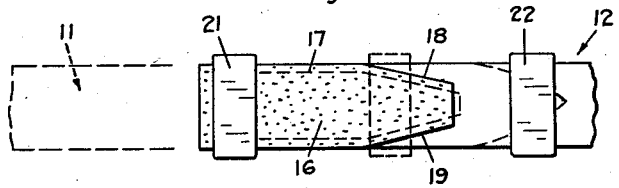
Figure 3 is a front elevational view of one end portion of the belt with the other end portion being shown in dotted lines.

Leather, and some other materials of which belts are made are provided with a smooth finished face and a rough face. Where the material has this characteristic, it is desirable that the rough face of member 14 be disposed outwardly as indicated by the stippling of Figure 3.

The wedge shaped member 14 is secured to the end portion 12 in such a position that a space is left between the end of portion 12 and the inner surface of the end of the loop. Before the wedge shaped member 14 is stitched to the end portion 12, the ends of a loop 21 are inserted in this space so that the stitching holds the loop 21 in position and retains it in its loop shaped form. This loop 21, as will be clear later, functions as a guiding loop.

Figure 4:
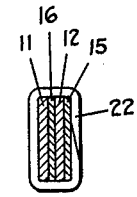
Figure 4 is a vertical sectional view with the section being taken along the line 4—4 of Figure 2.

Slidably disposed on the portion 12 is a second loop 22 which acts as a clamping loop. The ends of this loop may be secured together in any suitable manner. As shown in Figure 4, they may be bevelled, overlapped, and stitched together. The width of loop 22 is of considerable importance, as will be explained later.

Both loops 21 and 22 may be formed of any desired material but for purposes of simplicity in manufacture, it is desirable that these loops be formed of the same material as the other elements. Not only does this simplify the manufacture but the resilient, yieldable characteristics of such material aid in the action of the clamping loop 22.

Figure 2:
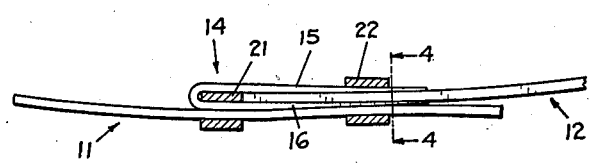
Figure 2 is a top plan view of the fastening means with the loops shown in section.

When it is desired to fasten the two end portions 11 and 12 together, the portion 11 is placed through the guiding loop 21 and is propelled forwardly until the belt has approximately the desired degree of tightness about the body of the wearer. During this operation, the loop 22 is preferably in a position such as shown in Figure 3. In this figure, the portion 11 is indicated merely in broken lines. When the free end portion 11 is in the desired position, the loop 22 is moved towards loop 21. Preferably, the depth of the loop 22 is such that within the extent of diagonal lines 18 and 19, it will begin to firmly clamp end portions 11 and 12 and the portions 15 and 16 of wedging member 14 tightly together. As is evident from Figure 2, the depth of the loop 22 is greater at the left hand end than at the right hand end. In other words, the front and rear walls of the loop are inclined, this inclination conforming to that of the wedge faces of portions 15 and 16. The loop is originally formed in this manner so that it exerts its clamping effect over the entire area of its front and rear walls. This not only increases the clamping effect but also decreases the tendency of the loop to stretch with use.

The action of clamping loop 22 tends to force the end portion 11 against the wedge shaped front face of loop 14 and also against the wedge shaped surfaces 18 and 19. Any tendency of the portion 11 to be pulled to the left causes this wedging action to be increased. The result is that the portions 11 and 12 are held firmly together and will resist a considerable force tending to pull them apart. Furthermore, the force which the loop will resist is considerably greater when this force is directed along the curved lines which the belt tends to follow when worn on the body of the wearer. In other words, the fastening means is such that it resists a considerably stronger force in an arcuate direction than in a lateral direction.

It is desirable but not necessary that the material employed be slightly hygroscopic. I have found where the material is somewhat hygroscopic as is the case with leather, that moisture tends to be absorbed from the body and causes the friction between the overlapping portions to be materially increased.

Figure 5:
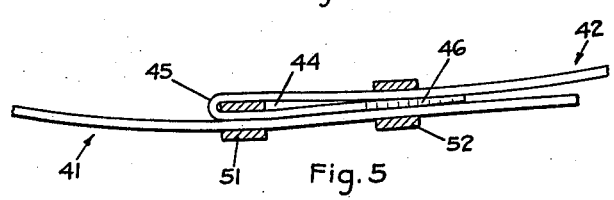
Figure 5 is a plan view, with the loops being shown in section, of a modified form of the belt fastening means.

Species of Figure 5

In the species of Figure 5, one end of the belt is looped around the wedge shaped member rather than having the wedge shaped member looped around the end of the belt.

Thus, referring to Figure 5, the belt end portions corresponding to end portions 11 and 12 have been designated by the reference numerals 41 and 42. The wedge shaped member is designated by the reference numeral 44. It will be noted that the end of belt 42 is bent back as at 45 and folded upon itself, the final portion being preferably slightly tapered as at 46 to increase the wedging action. As with the previous species, sufficient space is left between the edge of the wedge shaped member 44 and the bight of the loop to accommodate the ends of a loop 51 corresponding to loop 21. It is to be understood that the inner ends of loop 51, the wedge shaped member, and the overlapping portions of the belt end portion 42 are stitched together. Slidably disposed on the end portion 42 is a clamping loop 52. The belt portion 41 is designed to freely slide in the guiding loop 51 and to be clamped against the inclined surface of the end portion 42. It is to be noted that the rough side of the leather will be engaged by the portion 41. The clamping loop 52 is, of course, of such depth as to firmly clamp the members together when the loop is at a suitable position along the inclined surface.

The species of Figure 5 is similar to that of Figures 1 to 4 in that it relies entirely upon the wedge action for retaining the belt end portions in their relative positions. Furthermore, it is similar in that the guiding loop is retained between the wedge member and the belt, one of these two being looped over the other to surround the inner portion of the guiding loop.

Figure 7:
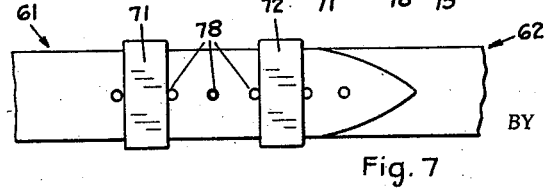
Figure 7 is a front elevational view of the belt fastening means of Figure 6.

Species of Figures 6 and 7

The species of Figures 6 and 7 is similar in all respects to that of Figures 1 to 4 with the exception that a stud is associated with the fixed belt portion, this stud being designed to cooperate with holes placed in the free end portion. In this figure, the free end portion is designated by the reference numeral 61 and the fixed end portion by the reference numeral 62. The wedge member is designated by the reference numeral 64 and its two longitudinally extending portions by the reference numerals 65 and 66. The guiding loop is designated by the reference numeral 71 and the clamping loop by the reference numeral 72. It is believed unnecessary to describe the relationship of these elements as they occupy exactly the same relationship to each other as do the corresponding elements of Figures 1 to 4. To facilitate a comparison of the two figures, the elements in Figures 6 and 7 have been given reference numerals exactly fifty higher than the corresponding reference numerals in Figures 1 to 4.

The difference between the presently described species and that of Figures 1 to 4 is in the location of a headed stud 75 within the fixed belt portion 62. This stud comprises a stem portion 76 and a head portion 77. The stud 75 may preferably be in the form of a conventional rivet such as used in harness work. The head 77 is interposed between the portion 65 of the wedge member 64 and the belt end portion 62. The stem 76 extends through a pair of aligned openings in the belt portion 62 and portion 66 of wedge member 64. The free belt portion 61 is provided with a series of openings 78 which are of slightly greater cross section than that of stem 76. The stem 76 is of such length that it not only projects through the openings in the portions 62 and 66 but is adapted to extend just through one of the openings 78 when the belt portion 61 is closely engaged against the wedging surface of portion 66.

In use, the free end portion 61 is drawn through the guiding loop 71 until the belt is at approximately the desired position. This end portion now is manipulated until stem 76 projects through the opening 78 which will cause the end portions 61 and 62 to assume relative positions closest to that desired. The clamping loop 72 is now moved to the left as before to firmly clamp the two belt portions 61 and 62 with respect to each other.

In this arrangement, the belt is held by the clamping action obtained with the arrangement of Figures 1 to 4 and is also held by the cooperation of stem 76 with the hole in which it is inserted. The clamping loop 72 plays a double function in not only aiding the clamping action but also in holding the belt end portion 61 closely adjacent to the underlying portion 66 so that the stem 76 will remain in the opening 78. It will be obvious that if the loop 72 were not provided, the end portion 61 would tend to move outwardly so as to clear the end of the stem 76 and permit separation of belt portions 61 and 62. Not only does the loop 72 aid the action of the stud 75 in retaining the end portion 72 in position laterally but it also tends to reduce the strain which might be placed on the stud 75. In other words, the belt portion 72 by itself, tends to prevent any longitudinal movement between end portions 61 and 62. As a result, if the stud 75 is subjected to any force, this force is very slight. If some such clamping means as is provided by the wedge shaped surface were not provided, the entire force tending to separate belt portions 61 and 62 would be applied to the stud 75 and eventually cause it to be bent in the path of the force tending to draw belt portion 61 away from portion 62. In the arrangements of Figures 6 and 7, however, the stud 75 merely supplements the action of the belt clamping arrangement and hence remains highly effective for the life of the belt.

While the stud 75 has been shown as centrally disposed between loops 71 and 72, when loop 72 is in its the clamping position, the stud 75 can be so located that it is covered by loop 72 when the latter is in its clamping position. This has the advantage of more effectively holding the portion 61 in position with respect to stud 75 and also of concealing the stud.

Conclusion

While I have shown and described the arrangement in connection with a belt worn as an article of clothing apparel, and while the invention is particularly adapted for this purpose, it is also applicable to coupling any two members of flexible yieldable material together. In general, while I have shown certain specific embodiments of my invention, it is to be understood that this is for purposes of illustration and that my invention is to be limited only by the scope of the appended claims.

What I claim is:

1. In a coupling, two portions of flexible yieldable material disposed in overlapping relationship, a member of similar material tapered both in thickness and width to provide a double wedging action, said member overlying one end of a first of said portions and secured thereto with its thickest end closest to the effective end of said portion, and a slidable loop surrounding said two overlapping portions and said tapered member and effective to clamp said overlapping portions together when said loop is moved towards the effective end of said first portion.

3. In a coupling, an end portion of flexible yieldable material, a wedge shaped portion of similar material overlying said end portion and secured thereto with its thickest end outermost, one of said portions being looped around the other, a guiding loop having its inner turn secured within the looped portion adjacent to the end of the other portion, a second end portion of flexible yieldable material extending through the guiding loop and overlapping said first end portion, and a slidable loop surrounding said two overlapping portions and said wedge shaped portion and effective to clamp said portions together when said loop is moved outwardly.

3. In a coupling, two portions of flexible yieldable material disposed in overlapping relationship, a wedge shaped portion of similar material overlying one end of a first of said overlapping portions and secured thereto with its thickest end closest to the effective end of said portion, said wedge shaped member being tapered both as to thickness and width to provide wedging action in two directions, and a slidable loop surrounding said two overlapping portions and said wedge shaped portion and effective to clamp said overlapping portions together when said loop is moved towards the effective end of said first portion.

4. In a coupling, two portions of flexible yieldable material disposed in overlapping relationship, a member of similar material looped around one end of a first of said portions and secured thereto, both ends of said member being tapered as to thickness so as to be wedge shaped and the end facing said other portion being also tapered as to width, and a slidable loop surrounding said two overlapping portions and the wedge shaped ends of said member and effective to clamp said overlapping portions together when said loop is moved towards the end of said first portion.

5. In a coupling, two portions of flexible yieldable material disposed in overlapping relationship, a wedge shaped portion of similar material overlying one end of a first of said overlapping portions and secured thereto with its thickest end closest to the effective end of said first portion, a stud having a head secured between said wedge shaped portion and said first portion and a stem projecting towards the other of said overlapping portions, said other portion having a plurality of apertures in which said stem can project, and a slidable loop surrounding said two overlapping portions and said wedge shaped portion and effective to clamp said overlapping portions together when said loop is moved towards the effective end of said first portion.

6. In a belt having two end portions adapted to overlap each other, said belt being formed of leather having a finished face and a rough face, a member of similar leather looped around one end of a first of said end portions and secured thereto with its rough face outermost, the ends of said member being tapered so as to be wedge shaped, and a slidable loop surrounding said wedge shaped member and said first portion and adapted to clamp said two portions together when they are placed in overlapping relationship and the loop is moved in the direction of the end of said first end portion.

HAROLD O. MURPHEY.